US012756328B2

(12) United States Patent
Fu et al.

(10) Patent No.: US 12,756,328 B2
(45) Date of Patent: Oct. 6, 2026

(54) POWER CONVERSION CIRCUIT AND POWER SUPPLY DEVICE

(71) Applicant: Delta Electronics (Shanghai) Co., Ltd., Shanghai (CN)

(72) Inventors: Qi Fu, Shanghai (CN); Daofei Xu, Shanghai (CN); Shengnan Xie, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 231 days.

(21) Appl. No.: 18/611,722

(22) Filed: Mar. 21, 2024

(65) Prior Publication Data

US 2024/0333170 A1 Oct. 3, 2024

(30) Foreign Application Priority Data

Mar. 29, 2023 (CN) ........................ 202310323171.7

(51) Int. Cl.

*H02M 1/44* (2007.01)
*H02M 1/00* (2006.01)
*H02M 1/42* (2007.01)
*H02M 3/335* (2006.01)
*H02M 7/04* (2006.01)

(52) U.S. Cl.

CPC ........... *H02M 7/05* (2021.05); *H02M 1/0006* (2021.05); *H02M 1/4208* (2013.01); *H02M 1/44* (2013.01); *H02M 3/33571* (2021.05); *H02M 3/33576* (2013.01)

(58) Field of Classification Search

CPC .. H02M 7/05; H02M 1/0006; H02M 3/33571; H02M 1/4208; H02M 1/44; H02M 3/33576

See application file for complete search history.

(56) References Cited

U.S. PATENT DOCUMENTS

| | | | | |
|---|---|---|---|---|
| 9,024,465 | B2 | 5/2015 | Guo | |
| 11,202,395 | B1 * | 12/2021 | Mulcahy | H05K 7/209 |
| 11,751,363 | B2 * | 9/2023 | Mulcahy | H02M 3/003 361/715 |

(Continued)

FOREIGN PATENT DOCUMENTS

| | | | |
|---|---|---|---|
| CN | 201682426 | U | 12/2010 |
| CN | 101610027 | B | 7/2013 |

(Continued)

*Primary Examiner* — Adolf D Berhane

(74) *Attorney, Agent, or Firm* — CKC & Partners Co., LLC

(57) ABSTRACT

The invention discloses a power conversion circuit and a power supply device. The power conversion circuit is applied to a power supply device, comprising: an AC/DC conversion circuit, wherein a DC side of the AC/DC conversion circuit has a first reference potential point; a first common-mode inductor; a DC/DC conversion circuit including a primary circuit having a second reference potential point, a secondary circuit and a transformer; wherein a first terminal of the first common-mode inductor is connected to the DC side of the AC/DC conversion circuit, and a second terminal of the first common-mode inductor is connected to the primary circuit of the DC/DC conversion circuit; the first reference potential point or the second reference potential point is connected to an electric field shield.

18 Claims, 8 Drawing Sheets

10

(56) References Cited

U.S. PATENT DOCUMENTS

| | | | | |
|---|---|---|---|---|
| 2013/0058134 | A1* | 3/2013 | Yamada | H02M 7/217 363/16 |
| 2018/0115256 | A1 | 4/2018 | Ho et al. | |
| 2024/0230746 | A1* | 7/2024 | Zhang | G01R 31/62 |

FOREIGN PATENT DOCUMENTS

| | | | | | |
|---|---|---|---|---|---|
| CN | 206962726 | U | | 2/2018 | |
| CN | 113258620 | A | | 8/2021 | |
| CN | 113726137 | A | | 11/2021 | |
| CN | 114290922 | A | * | 4/2022 | H02J 7/35 |
| CN | 115755849 | A | | 3/2023 | |
| CN | 115811105 | A | | 3/2023 | |
| EP | 2013964 | B1 | | 4/2015 | |
| EP | 3916980 | A1 | * | 12/2021 | H02M 7/487 |

* cited by examiner

10

30

40

50

POWER CONVERSION CIRCUIT AND POWER SUPPLY DEVICE

CROSS-REFERENCE TO RELATED APPLICATIONS

This non-provisional application claims priority under 35 U.S.C. § 119(a) on Patent Application 202310323171.7 filed in P.R. China on Mar. 29, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to the field of power electronics technology, and particularly to a power conversion circuit and a power supply device.

2. Related Art

High-power power supply adapter is often composed of an electromagnetic interference (EMI) filter, a rectifier circuit, a power factor correction circuit (PFC) and a DC/DC conversion circuit. Generally, the electromagnetic interference (EMI) filter includes a differential-mode filter and a common-mode filter, and is disposed between an AC power supply and the rectifier circuit, i.e., an input AC side, and the common-mode filter includes a common-mode inductor, i.e., a common-mode choke, which is often applied to filter common-mode electromagnetic interference signals to suppress common-mode noise in a computer power supply adapter, as shown in FIG. 1. In general, the power supply adapter shall operate under a range of voltage in order to adapt the worldwide different power grid, i.e., an AC input voltage is from 90 Vac to 264 Vac. When the input voltage is at 90 Vac, an input current becomes large, and loss caused by the common-mode inductor is large. With increasing of power of the power supply adapter, since the input voltage is fixed, the input current also increases, and loss caused by the common-mode inductor becomes larger. One solution for reducing loss of the common-mode inductor of the high-power power supply adapter is to use a common-mode inductor with large magnet ring and a wire with thick diameter. However, such method causes large size of the common-mode inductor, and does not facilitate a high power density and high efficiency of the high-power power supply adapter.

Therefore, it is urgent to provide a technical solution adapted to a high-power adapter for reducing loss and minimize a size of the common-mode inductor without influence on the EMI performance.

SUMMARY OF THE INVENTION

An object of the invention is to provide a power conversion circuit and a power supply device, which can solve one or more deficiencies in the prior art.

In order to achieve the object, according to one embodiment of the invention, provided is a power conversion circuit applied to a power supply device, including: an AC/DC conversion circuit, wherein a DC side of the AC/DC conversion circuit has a first reference potential point; a first common-mode inductor; a DC/DC conversion circuit including a primary circuit having a second reference potential point, a secondary circuit having a third reference potential point, and a transformer; wherein a first terminal of the first common-mode inductor is connected to the DC side of the AC/DC conversion circuit, and a second terminal of the first common-mode inductor is connected to the primary circuit of the DC/DC conversion circuit; the first reference potential point or the second reference potential point is connected to an electric field shield.

According to one embodiment of the invention, provided is a power supply device, including: an insulating shell; a metal shielding layer disposed within the insulating shell; a power conversion circuit, including: an AC/DC conversion circuit, wherein a DC side of the AC/DC conversion circuit has a first reference potential point; a first common-mode inductor; a DC/DC conversion circuit including a primary circuit having a second reference potential point, a secondary circuit having a third reference potential point, and a transformer; wherein a first terminal of the first common-mode inductor is connected to the DC side of the AC/DC conversion circuit, and a second terminal of the first common-mode inductor is connected to the primary circuit of the DC/DC conversion circuit; the first reference potential point or the second reference potential point is connected to the metal shield layer.

The invention provides a power conversion circuit and a power supply device, which can obviously reduce power loss and a size of the first common-mode inductor without influence on electromagnetic interference filtering performance, thereby improving a power density and efficiency of the high-power power supply device.

BRIEF DESCRIPTION OF THE DRAWINGS

To clearly explain the technical solution implemented by the invention, hereinafter the accompanying drawings used in the embodiments are simply introduced.

Additional aspects and advantages of the invention are partially explained in the below description, and partially become apparent from the description, or can be obtained from practice of the invention.

DETAILED EMBODIMENTS OF THE INVENTION

The exemplary implementations will now be described more fully with reference to the accompanying drawings. However, the exemplary implementations may be implemented in various forms and should not be understood as being limited to the implementations set forth herein; on the contrary, these implementations are provided so that this disclosure will be thorough and complete, and the conception of exemplary implementations will be fully conveyed to those skilled in the art.

When introducing the described and/or illustrated factors or components or the like, the words "one", "first", "the" and "at least one" represent one or more factors or components, or the like. The terms "comprise", "include" and "have" represent an open and including meaning, and refer to other factors or components, or the like, except the listed factors, components or the like. Moreover, the terms "first", "second" and the like in the claims are only used as signs, instead of limiting the numbers of the object.

Figure 1:
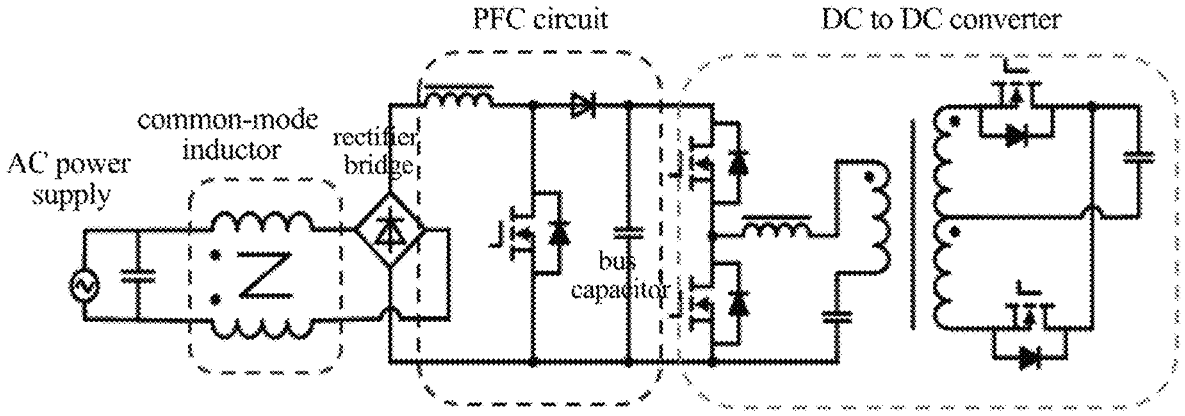
FIG. 1 is a topological diagram of a circuit of an adapter in the prior art.
Figure 2:
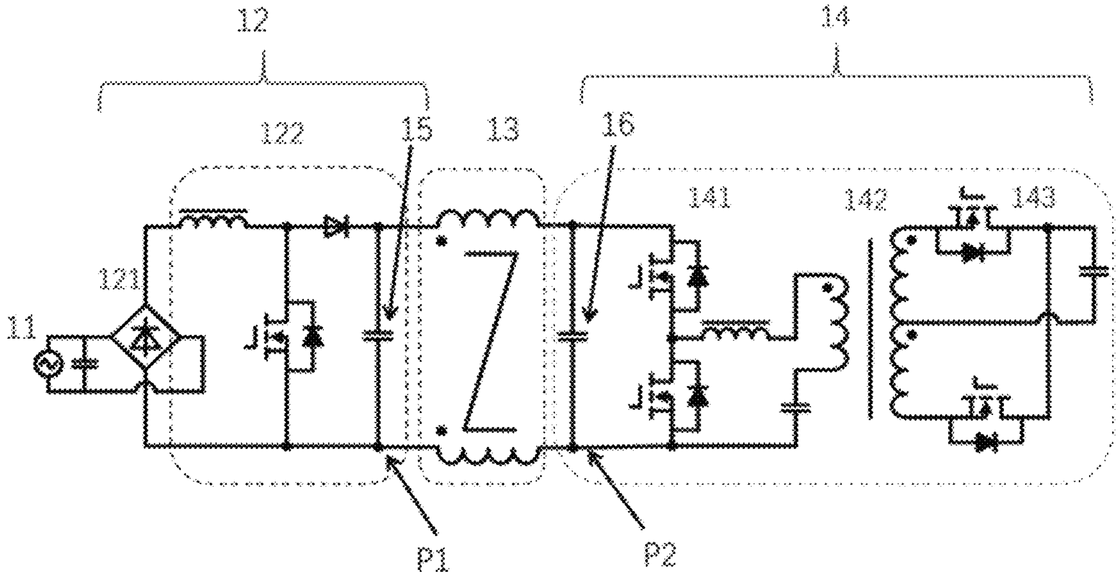
FIG. 2 is a topological diagram of a power conversion circuit according to one embodiment of the invention.

FIG. 2 is a topological diagram of a power conversion circuit 10 according to one embodiment of the invention. As shown in FIG. 2, the power conversion circuit 10 includes an AC/DC conversion circuit 12, a first common-mode inductor 13 and a DC/DC conversion circuit 14. An AC power supply 11 is connected to the AC/DC conversion circuit 12, a DC side of the AC/DC conversion circuit 12 is connected to a first terminal of the first common-mode inductor 13, a second terminal of the first common-mode inductor 13 is connected to a primary circuit 141 of the DC/DC conversion circuit 14, and the AC power supply and the AC/DC conversion circuit may further have a differential-mode filter circuit therebetween, but the disclosure is not limited thereto. The AC/DC conversion circuit 12 includes a rectifier circuit 121 and a power factor correction circuit 122 connected sequentially, and the DC side of the AC/DC conversion circuit 12 has a first reference potential point P1. Specifically, the first reference potential point P1 is located in the power factor correction circuit 122. The DC/DC conversion circuit 14 includes the primary circuit 141 having a second reference potential point P2, a transformer 142 and a secondary circuit 143. The power conversion circuit 10 further includes a second capacitor 15 disposed between the first common-mode inductor 13 and the AC/DC conversion circuit 12 and being an output capacitor of the AC/DC conversion circuit, and a third capacitor 16 disposed between the first common-mode inductor 13 and the DC/DC conversion circuit 14 and being an input capacitor of the DC/DC conversion circuit. The first reference potential point P1 or the second reference potential point P2 located on the primary side of the transformer is connected to an electric field shield, and for example, the electric field shield may be a metal shield layer. The first reference potential point P1 may be disposed at a second end of the second capacitor 15, and the second reference potential point P2 may be disposed at a second end of the third capacitor 16, but positions of the first reference potential point P1 and the second reference potential point P2 are not limited thereto. The first reference potential point P1 and the second reference potential point P2 may be located at any point with a fixed voltage level in the AC/DC conversion circuit and the primary circuit of the DC/DC conversion circuit respectively. For example, the first reference potential point P1 may be located at a first end or a second end of the second capacitor, and the second reference potential point P2 may be located at a first end or a second end of the third capacitor in the primary circuit of the DC/DC conversion circuit.

In this embodiment, the power conversion circuit 10 further includes a radio frequency interference filter circuit (not shown). The radio frequency interference filter circuit is disposed between the AC power supply 11 and the AC/DC conversion circuit 12, and includes a second common-mode inductor for suppressing radio frequency interference in the power conversion circuit 10.

Figure 3:
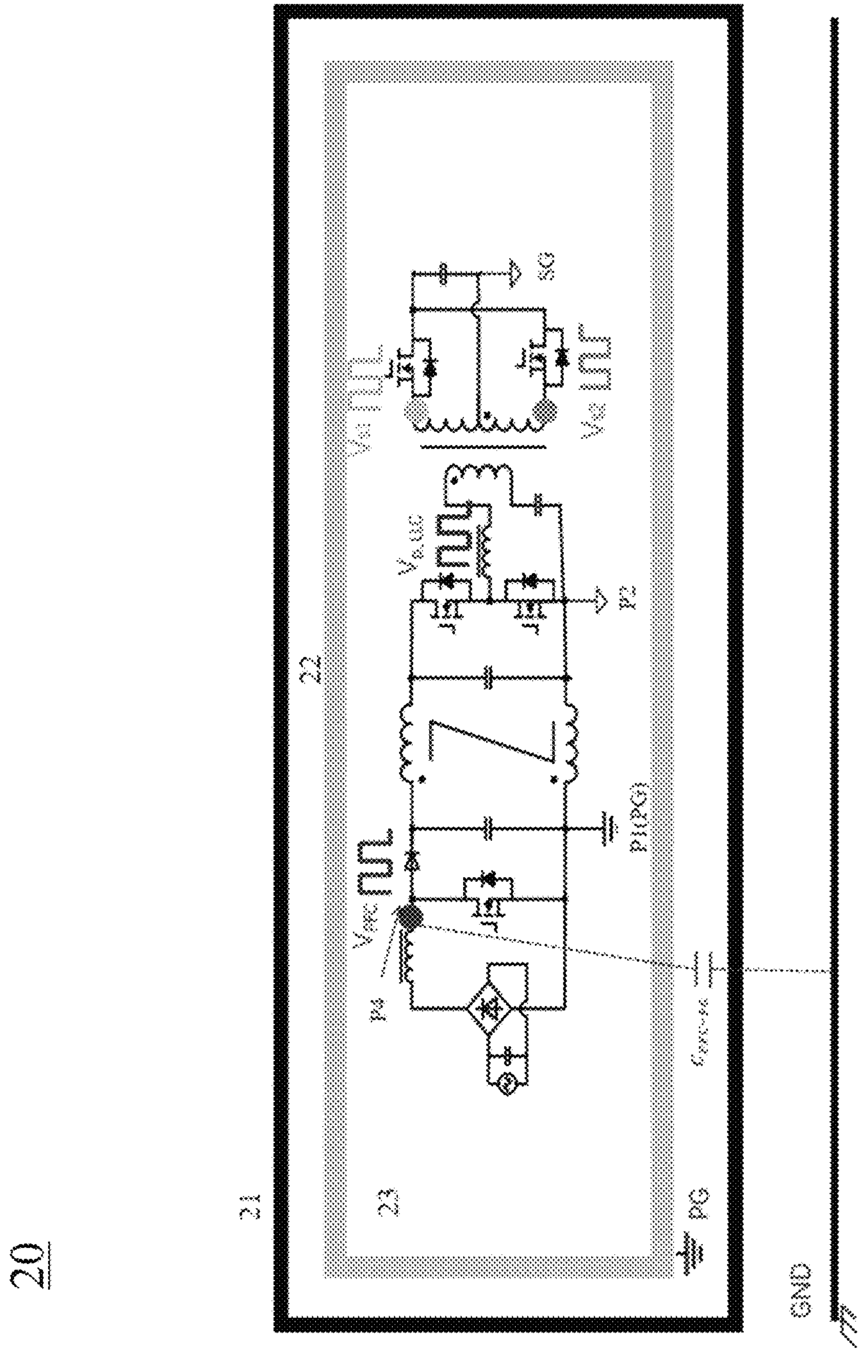
FIG. 3 is a structural diagram of a power supply device where a first common-mode inductor is located at a DC side.

Hereinafter implementation of this embodiment is explained in details combining with FIG. 3. FIG. 3 is a structural diagram of a power supply device 20 where a first common-mode inductor is located at a DC side. The power supply device 20 is, for example, an adapter, and includes an insulating shell 21, a metal shield layer 22 and a power conversion circuit 23, the insulating shell 21 may be a plastic shell, and copper may be used as the metal shield layer 22, but the invention is not limited thereto. The power conversion circuit 23 includes an AC/DC conversion circuit, a first common-mode inductor and a DC/DC conversion circuit connected sequentially. The AC/DC conversion circuit includes a rectifier circuit and a power factor correction circuit connected sequentially, a DC side of the AC/DC conversion circuit has a first reference potential point P1 located in the power factor correction circuit, and the DC/DC conversion circuit includes a primary circuit having a second reference potential point P2, a transformer and a secondary circuit.

As shown in FIG. 3, $C_{PFC-FG}$ is parasitic capacitance of a point P4 in the power factor correction circuit to ground, and a common mode current flows through $C_{PFC-FG}$ and returns to power lines via ground. When the first reference potential point P1 and the metal shield layer 22 are electrically connected to form a primary ground, a value of $C_{PFC-FG}$ decreases, effectively eliminating common-mode current produced by the power factor correction circuit, and in such case, when the first common-mode inductor is disposed between the AC/DC conversion circuit and the DC/DC conversion circuit, electromagnetic interference filtering performance of the power conversion circuit 23 is not affected. Similarly, by establishing an electrical connection between the second reference potential point P2 and the metal shield layer, the value of $C_{PFC-FG}$ may also be reduced. Therefore, a reference potential point connected to the metal shield layer may be disposed at the primary side of the transformer.

Figure 4:
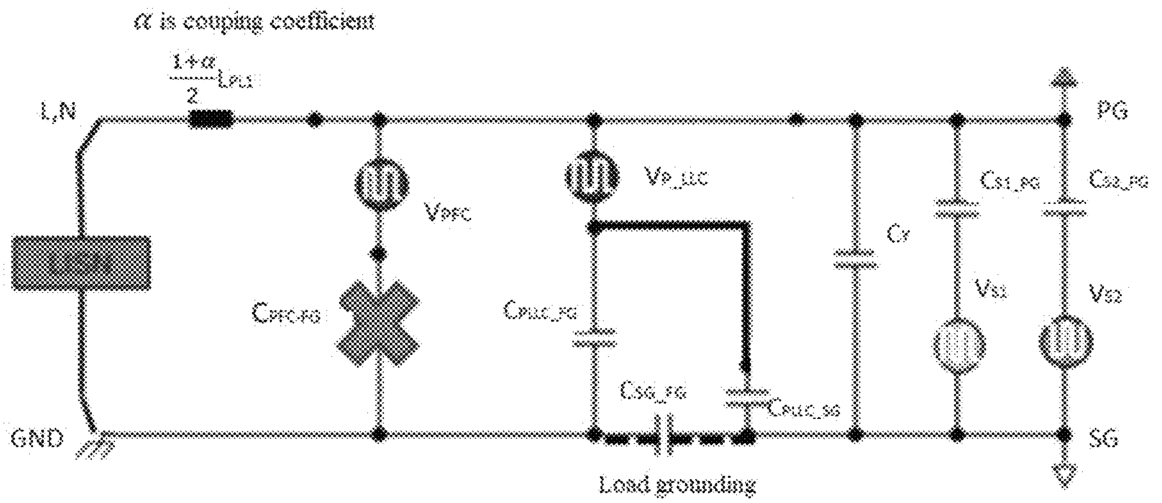
FIG. 4 is a common-mode equivalent model diagram of a power supply device where a first common-mode inductor is located at an AC side.
Figure 5:
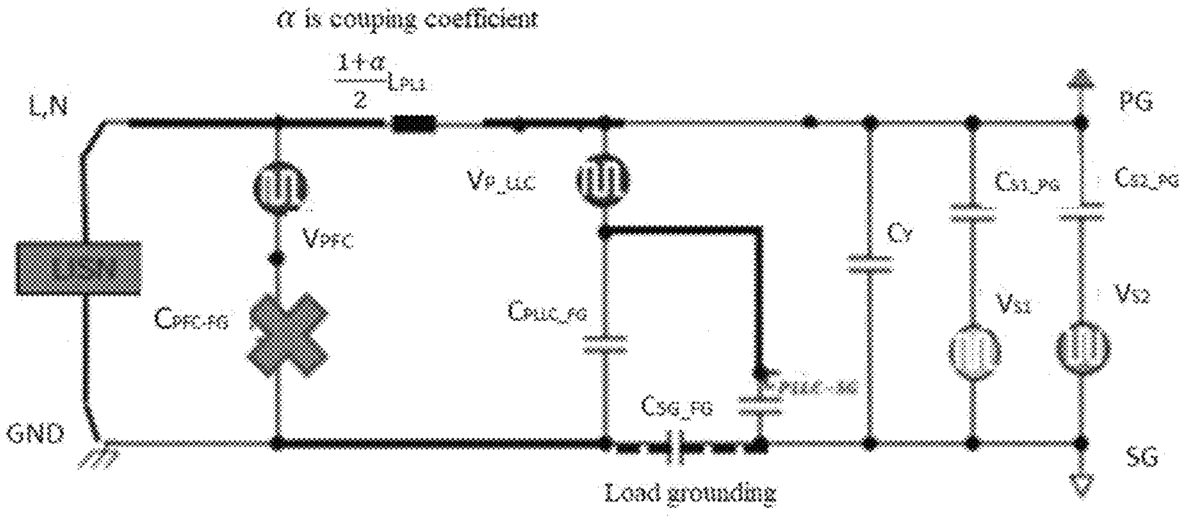
FIG. 5 is a common-mode equivalent model diagram of a power supply device where a first common-mode inductor is located at a DC side.

FIG. 4 is a common-mode equivalent model diagram of a power supply device where a first common-mode inductor is located at an AC side, and FIG. 5 is a common-mode equivalent model diagram of a power supply device where a first common-mode inductor is located at a DC side. Since $C_{PFC-FG}$ can be omitted by connecting a reference potential point disposed at the primary side of the transformer to the metal shield layer, i.e., common-mode noise of the PFC can be omitted, the common-mode equivalent models with the first common-mode inductor at the AC side and the DC side are the same in theory.

Figure 6:
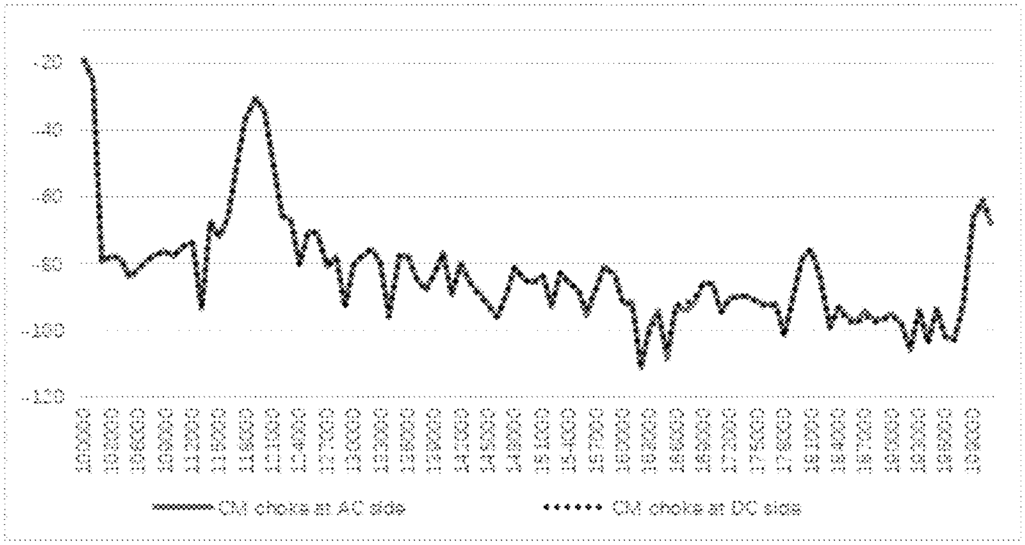
FIG. 6 is a diagram of simulation results of electromagnetic interference filtering of the common-mode equivalent model shown in FIGS. 4 and 5.

FIG. 6 shows the EMI results of the common-mode equivalent models of FIGS. 4 and 5 obtained by simulation software. As shown in FIG. 6, a simulation curve of the first common-mode inductor at the AC side represented by a solid line, a simulation curve of the first common-mode inductor at the DC side represented by a dotted line, and the two simulation curves substantially coincide. That is, electromagnetic interference filtering performance of the power conversion circuit 23 can be ensured when a first common-mode inductor is located at a DC side.

Figure 7:
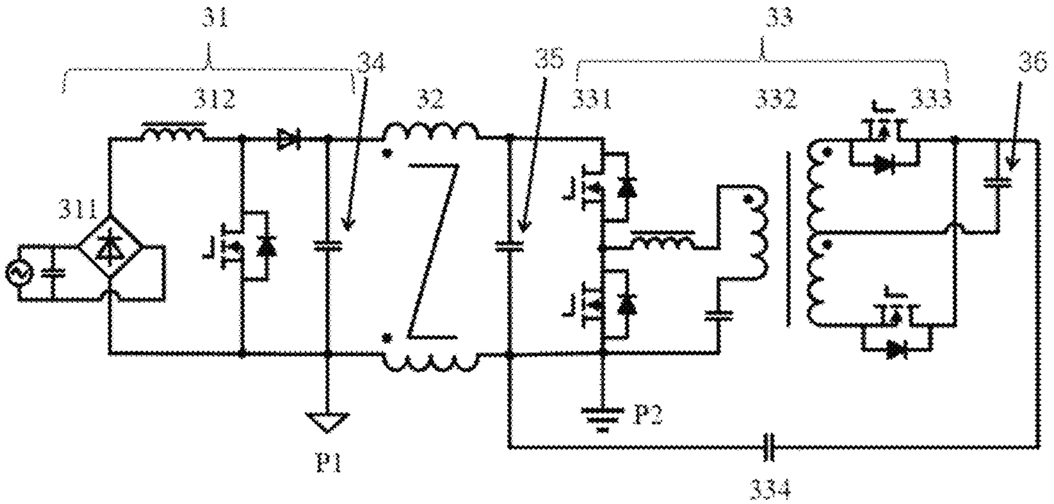
FIG. 7 is a topological diagram of a power conversion circuit according to another embodiment of the invention.

In some other embodiments, a first capacitor is connected between the secondary circuit and the primary circuit of the DC/DC conversion circuit. As shown in FIG. 7, the power conversion circuit 30 includes an AC/DC conversion circuit 31, a first common-mode inductor 32 and a DC/DC conversion circuit 33. The AC/DC conversion circuit 31 includes a rectifier circuit 311, and a power factor correction circuit 312 having a first reference potential point P1 located at a second end of a second capacitor 34, the DC/DC conversion circuit 33 includes a primary circuit 331 having a second reference potential point P2 located at a second end of a third capacitor 35, a transformer 332 and a secondary circuit 333, and the first reference potential point P1 or the second reference potential point P2 is electrically connected to an electric field shield. A first capacitor 334 is connected between the primary circuit 331 and the secondary circuit 333 of the DC/DC conversion circuit 33, a first end of the first capacitor 334 is connected to a first end of an output capacitor 36 of the DC/DC conversion circuit, a second end of the first capacitor 334 is connected to the second reference potential point P2, but the connection way is not limited thereto. For example, the first end and the second end of the first capacitor 334 may also be connected to a second end of the output capacitor 36 of the DC/DC conversion circuit and a first end of the third capacitor 35 respectively. Since the power factor correction circuit 312 and the DC/DC conversion circuit 33 are separated by the first common-mode inductor 32, the first end of the first capacitor 334 on the secondary circuit 333 may be connected to any end of the output capacitor 36 of the secondary circuit of the DC/DC conversion circuit, and the second end of the first capacitor 334 on the primary circuit 331 may be connected to any end of the third capacitor 35 of the primary circuit of the DC/DC conversion circuit, thereby ensuring that common-mode noise in the DC side firstly flows through the first capacitor 334, and then the first common-mode inductor 32, which the first capacitor 334 and the first common-mode inductor 32 forms a LC filter structure, such that filtering effect is further optimized.

Since the first reference potential point P1 or the second reference potential point P2 is electrically connected to the electric field shield, the value of $C_{PFC\text{-}FG}$ becomes small, such that common-mode noise produced by the power factor correction circuit and the DC/DC conversion circuit can be omitted, and in such case, when the first common-mode inductor is moved from the AC side to the DC side, i.e., the first common-mode inductor is disposed between the AC/DC conversion circuit and the DC/DC conversion circuit, the electromagnetic interference filtering performance of the power conversion circuit is not affected. When a voltage at a DC bus side of an output terminal of the power factor correction circuit is 4 to 5 times of an AC power supply voltage, a current at the DC bus side is ¼ to ⅕ of a current at an input AC side. In other words, power loss caused by the first common-mode inductor disposed at the DC side can be reduced to 1/16 to 1/25 of the power loss caused by the first common-mode inductor disposed at the AC side. Since power loss of the first common-mode inductor is reduced, efficiency of the power conversion circuit is significantly improved. Meanwhile, since a current flows through the first common-mode inductor is decreased, a smaller magnet ring and a thinner wire diameter can be adopted, thereby reducing a size of the first common-mode inductor and enhancing a power density of the power conversion circuit 10. Meanwhile, a first capacitor is disposed between the primary circuit and the secondary circuit of the DC/DC conversion circuit, such that common-mode noise of the secondary circuit of the DC/DC conversion circuit firstly flows through the capacitor 334, and then the first common-mode inductor 32, which the first capacitor and the first common-mode inductor forms a LC filter structure, such that filtering effect is further optimized. Therefore, an object of obviously reducing power loss and a size of the first common-mode inductor and improving a power density can be reached without affect the electromagnetic interference filtering performance.

Since the power conversion circuit further includes but not limited to a control circuit, an auxiliary power supply circuit and a communication circuit, in addition to a main power circuit, there is also a first equivalent impedance between the power factor correction circuit 312 and the DC/DC conversion circuit 33, the first equivalent impedance is connected in parallel to the first common-mode inductor 32 in the circuit equivalent model, and a first equivalent impedance value and an impedance value of the first common-mode inductor 32 are associated with an operating frequency of the power conversion circuit. In some embodiments, By isolating the power factor correction circuit 312 and the DC/DC conversion circuit 33 from their respective control circuits, the auxiliary power supply circuits and the communication circuits, the first equivalent impedance value between the power factor correction circuit 312 and the DC/DC conversion circuit 33 is greater than the impedance value of the first common-mode inductor 32 under an operating frequency, which the operating frequency may be within an operating frequency interval, to ensure that the first common-mode inductor is not short-circuited in order to play the role of electromagnetic interference filter, and the implementation is not limited thereto. That is, within an interval of the operating frequency of the power conversion circuit, the impedance value between the AC/DC conversion circuit and the DC/DC conversion circuit may be greater than ½ of the impedance value of the first common-mode inductor, when the operating frequency of the power conversion circuit may be any operating frequency within a frequency range from 150 kHz to 500 kHz, but the operating frequency is not limited thereto.

Figure 8A:
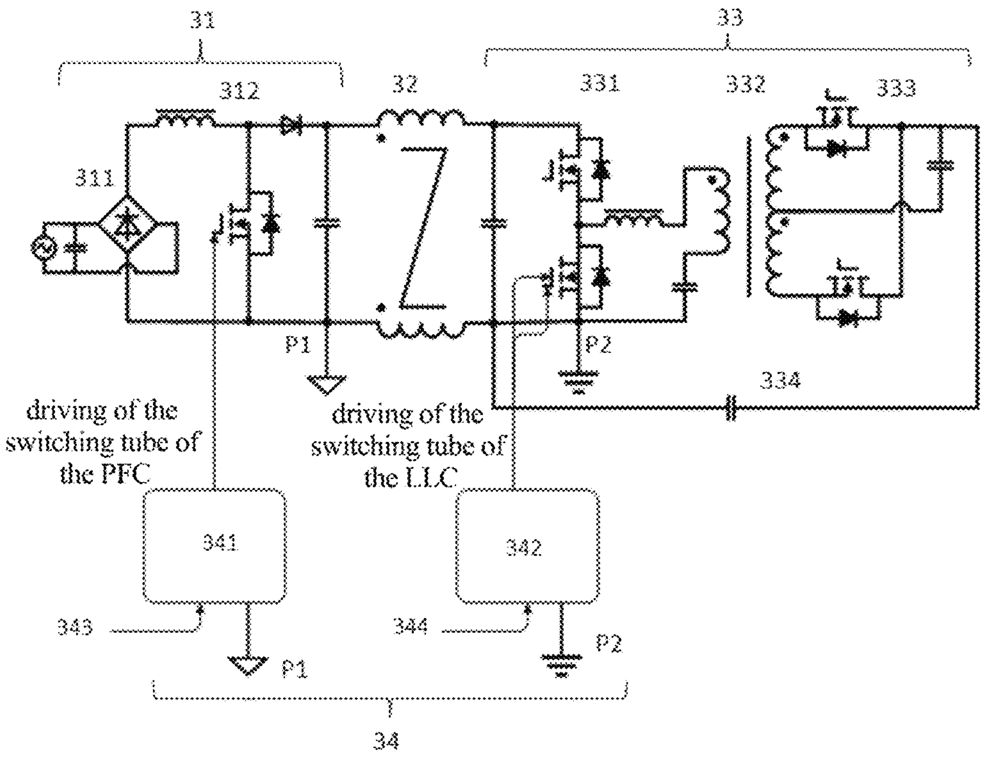
FIG. 8A is a topological diagram of a control circuit in the power conversion circuit of FIG. 7.

Referring to FIG. 8A, the power conversion circuit 30 further includes a control circuit 34, and the control circuit 34 includes a first control circuit 341 for controlling switching devices in the AC/DC conversion circuit 31, and a second control circuit 342 for controlling switching devices in the DC/DC conversion circuit 33. The first control circuit 341 is electrically connected to the first reference potential point P1, and the second control circuit 342 is electrically connected to the second reference potential point P2.

Figure 8B:
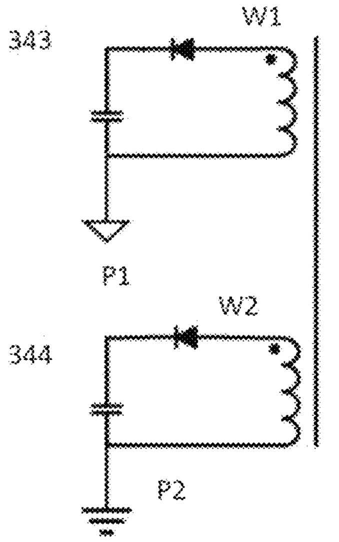
FIG. 8B is a topological diagram of a power supply circuit of the control circuit shown in FIG. 8A.

FIG. 8B is a topological diagram of a power supply circuit of the control circuit 34 shown in FIG. 8A. As shown in FIG. 8B, the power conversion circuit 30 further includes a first auxiliary power supply circuit 343 for powering the first control circuit 341, and a second auxiliary power supply circuit 344 for powering the second control circuit 342. The first auxiliary power supply circuit 343 and the second auxiliary power supply circuit 344 are coupled to a primary winding of the transformer 332 through a first auxiliary winding W1 and a second auxiliary winding W2, respectively. A first end of the first auxiliary power supply circuit 343 is connected to a first end of the first auxiliary winding W1, a second end of the first auxiliary power supply circuit 343 is connected to a second end of the first auxiliary winding W1 and electrically connected to the first reference potential point P1, a first end of the second auxiliary power supply circuit 344 is connected to a first end of the second auxiliary winding W2, and a second end of the second auxiliary power supply circuit 344 is connected to a second end of the second auxiliary winding W2 and electrically connected to the second reference potential point P2. The controllers are powered by separate auxiliary power supply circuits through respective auxiliary windings, and the auxiliary power supply circuits are connected to their respective reference potential points to isolate the reference potential points of the PFC circuit and the DC/DC conversion circuit on both sides of the first common-mode inductor, such that an impedance between the power factor correction circuit and the isolated DC/DC conversion circuit is greater than an impedance of the first common-mode inductor, which ensures that the first common-mode inductor will not be short circuited and is able to play the role of electromagnetic interference filter.

In some other embodiments, the first control circuit 341 and the second control circuit 342 can also be separately powered by isolated power supplies. It should be noted that the auxiliary power supply circuits for the first control circuit and the second control circuit need to be isolated from each other, and the specific method of connection is not limited thereto.

In still some other embodiments, the first control circuit 341 and the second control circuit 342 may not have a communication circuit therebetween. After the AC/DC conversion circuit starts working, the second control circuit may control the DC/DC conversion circuit to work by the way of detecting whether a DC bus voltage reaches a set value, and the way that the control circuits control the corresponding main power circuit to work is not limited thereto.

By isolating of including the respective control circuits, the auxiliary power supply circuits and the communication circuits, but not limited to, of the AC/DC conversion circuit and the DC/DC circuit in the power conversion circuit, A first equivalent impedance value between the AC/DC conversion circuit and the DC/DC conversion circuit is greater than an impedance value of the first common-mode inductor, and the impedance value between the AC/DC conversion circuit and the DC/DC conversion circuit is greater than ½ of the impedance value of the first common-mode inductor so when common-mode noise produced by the DC/DC conversion circuit flows to the AC/DC conversion circuit, the common-mode noise is filtered by the first common-mode inductor.

Figure 9:
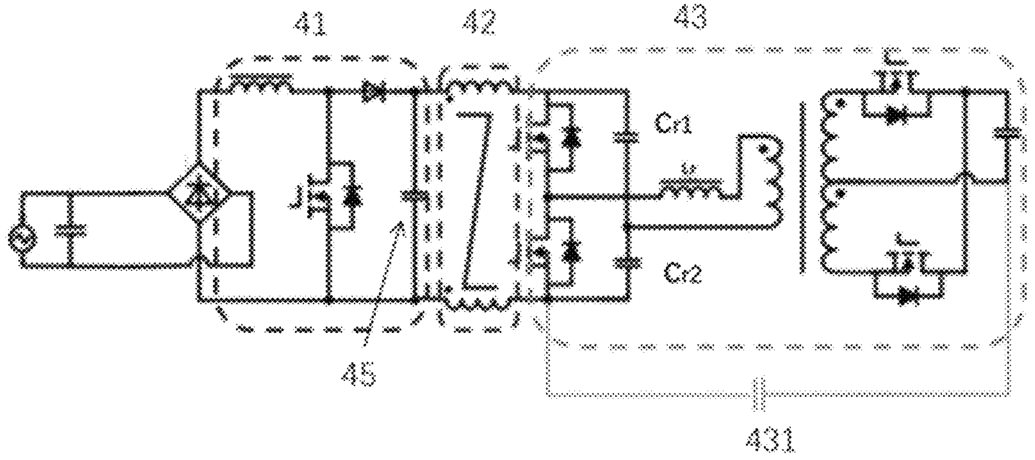
FIG. 9 is a topological diagram of a power conversion circuit according to another embodiment of the invention.

FIG. 9 is a topological diagram of a power conversion circuit 40 according to another embodiment of the invention. The power conversion circuit 40 includes an AC/DC conversion circuit 41, a first common-mode inductor 42, a DC/DC conversion circuit 43, a first capacitor 431, and a second capacitor 45 disposed between the first common-mode inductor 42 and the AC/DC conversion circuit 41. A primary circuit of the DC/DC conversion circuit 43 includes a resonant inductor Lr, a resonant capacitor Cr1 and a resonant capacitor Cr2, the resonant capacitor Cr1 and the resonant capacitor Cr2 are connected in series, and have a first node therebetween, and the resonant inductor Lr is connected to the first node. Since Cr1 and Cr2 connected in series and connected in parallel to both ends of the second capacitor, which is equivalent to a third capacitor, and Cr1 and Cr2 connected to the resonant inductor Lr so that they can also play the role of a resonant capacitor at the same time, this embodiment is to integrate the third capacitor with the resonant capacitor in comparison with the structure of the power conversion circuit shown in FIGS. 2 and 7, so as to further simplify the power conversion circuit, and further reduce a size of the power conversion module.

Figure 10:
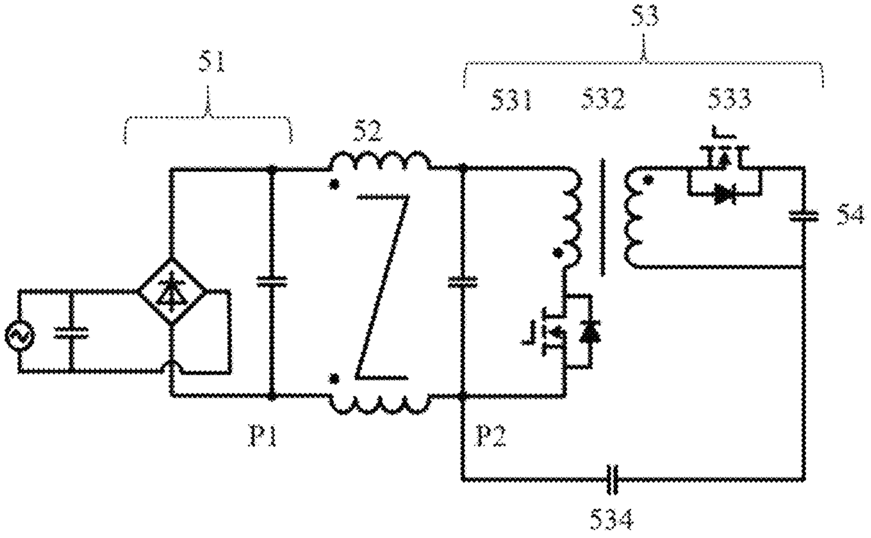
FIG. 10 is a topological diagram of a power conversion circuit according to another embodiment of the invention.
Figure 11:
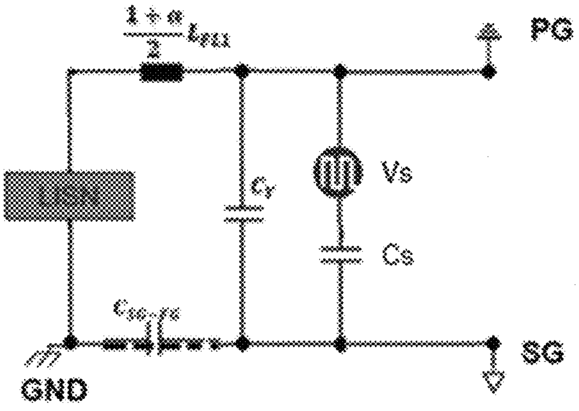
FIG. 11 is a schematic diagram of a common-mode equivalent model of a power supply device including the power conversion circuit of FIG. 10.

As for a power conversion circuit without a power factor correction circuit, it is also possible to move the first common-mode inductor from the AC side to the DC side of the AC/DC conversion circuit. FIG. 10 is a topological diagram of a power conversion circuit 50 according to another embodiment of the invention. The power conversion circuit 50 includes an AC/DC conversion circuit 51 including a first reference potential point P1, a first common-mode inductor 52 and a DC/DC conversion circuit 53 connected sequentially, the DC/DC conversion circuit 53 includes a primary circuit 531 having a second reference potential point P2, a transformer 532 and a secondary circuit 533, and positions of the first reference potential point P1 and the second reference potential point P2 are not limited thereto. The first reference potential point P1 or the second reference potential point P2 may be connected to an electric field shield (not shown), the first reference potential point P1 may be a first reference ground, and the second reference potential point P2 may be a second reference ground. The DC/DC conversion circuit 53 further includes a first capacitor 534 having a first end connected to a second end of an output capacitor 54 of the DC/DC conversion circuit, i.e., a second fixed voltage potential point of the secondary circuit of the DC/DC conversion circuit, and a second end of the capacitor 534 is connected to the second reference potential point P2, i.e., a first fixed voltage potential point of the primary circuit of the conversion circuit. Connection way of the first capacitor 534 is not limited thereto, and the first fixed voltage potential point and the second fixed voltage potential point may be any fixed voltage potential point in the primary circuit 531 and the secondary circuit 533 respectively. FIG. 11 is a schematic diagram of a common-mode equivalent model of a power supply device including the power conversion circuit of FIG. 10. As can be known from the equivalent model, when the common-mode inductor is located at a DC side of the power conversion circuit, electromagnetic interference filtering effect in the circuit is not affected, and loss of the common-mode inductor is reduced.

The power conversion circuit shown in the embodiments of the invention arranges the first common-mode inductor at the DC side of the power conversion circuit by connecting the reference potential point of the circuits at the primary side of the transformer and the electric field shield, thus obviously reducing power loss and a size of the first common-mode inductor without influence on the electromagnetic interference filtering effect, and the power conversion circuit shown in the embodiments of the invention may be applied to the power supply device 20 of FIG. 3, so as to obtain a power supply device with a high power density and high efficiency.

Combining with FIGS. 2 to 11, the power supply device includes an insulting shell, a metal shield layer and a power conversion circuit, and the power conversion circuit includes an AC/DC conversion circuit, wherein a DC side of the AC/DC conversion circuit has a first reference potential point, a first common-mode inductor, and a DC/DC conversion circuit including a primary circuit having a second reference potential point, a secondary circuit and a transformer. A first terminal of the first common-mode inductor is connected to the DC side of the AC/DC conversion circuit, and a second terminal of the first common-mode inductor is connected to the primary circuit of the DC/DC conversion circuit. An equivalent impedance between the AC/DC conversion circuit and the DC/DC conversion circuit is greater than an impedance of the first common-mode inductor.

The first reference potential point or the second reference potential point is connected to the metal shield layer, the first reference potential point may be a first reference ground, and the second reference potential point may be a second reference ground. The DC/DC conversion circuit includes a first capacitor, and a first end and a second end of the capacitor are connected to the first fixed voltage potential point and the second fixed voltage potential point in the primary circuit and the secondary circuit, respectively.

The power conversion circuit further includes a control module, and the control module includes a first control circuit for controlling switching devices in the AC/DC conversion circuit and a second control circuit for controlling switching devices in the DC/DC conversion circuit. The first control circuit is electrically connected to the first reference potential point, and the second control circuit is electrically connected to the second reference potential point.

The power conversion circuit further includes an auxiliary power supply module, and the auxiliary power supply module includes a first auxiliary power supply circuit for powering the first control circuit and a second auxiliary power supply circuit for powering the second control circuit. The first auxiliary power supply circuit and the second auxiliary power supply circuit may be coupled to the transformer in the DC/DC conversion circuit through a first auxiliary winding and a second auxiliary winding, respectively, a first end of the first auxiliary power supply circuit is connected to a first end of the first auxiliary winding, a second end of the first auxiliary power supply circuit is connected to a second end of the first auxiliary winding and electrically connected to the first reference potential point, a first end of the second auxiliary power supply circuit is connected to a first end of the second auxiliary winding, and a second end of the second auxiliary power supply circuit is connected to a second end of the second auxiliary winding and electrically connected to the second reference potential point.

The auxiliary power supply module includes a first independent power supply for powering the first control circuit and a second independent power supply for controlling the second control circuit.

In some embodiments, the power conversion circuit further includes a second capacitor disposed between the first common-mode inductor and the AC/DC conversion circuit, and a third capacitor disposed between the first common-mode inductor and the DC/DC conversion circuit or integrated into the resonant capacitor of the DC/DC conversion circuit.

In some embodiments, the power conversion circuit further includes a radio frequency interference filter disposed at an AC side of the AC/DC conversion circuit and including a second common-mode filter for suppressing radio frequency interference in the power conversion circuit.

Although the embodiments of the invention have been illustrated and described, as for those ordinary in the art, it can be understood that these embodiments may have various changes, modifications, alternations and variations without departing from principle and spirit of the invention, and the protection scope of the invention is determined by the scope defined by the appended claims.

What is claimed is:

1. A power conversion circuit applied to a power supply device, comprising:
- an AC/DC conversion circuit, wherein a DC side of the AC/DC conversion circuit has a first reference potential point;
- a first common-mode inductor;
- a DC/DC conversion circuit comprising a primary circuit having a second reference potential point, a secondary circuit and a transformer; wherein,
- a first terminal of the first common-mode inductor is connected to the DC side of the AC/DC conversion circuit, and a second terminal of the first common-mode inductor is connected to the primary circuit of the DC/DC conversion circuit;
- the first reference potential point or the second reference potential point is connected to an electric field shield.

2. The power conversion circuit according to claim 1, further comprising:
- a first capacitor;
- a second capacitor connected in parallel to an output terminal of the AC/DC conversion circuit;
- a third capacitor connected in parallel to an input terminal of the DC/DC conversion circuit; wherein,
- a first end of the first capacitor is connected to one end of the third capacitor, and a second end of the first capacitor is electrically connected to one end of an output capacitor of the DC/DC conversion circuit.

3. The power conversion circuit according to claim 2, wherein,
- the third capacitor comprises a first resonant capacitor and a second resonant capacitor connected in series and having a first node therebetween;
- the primary circuit of the DC/DC conversion circuit further comprises a switch bridge arm and a resonant inductor, a first end of a primary winding of the transformer is connected to a central point of the switch bridge arm through the resonant inductor, and a second end of the primary winding of the transformer is connected to the first node.

4. The power conversion circuit according to claim 2, wherein the AC/DC conversion circuit further comprises:
- a rectifier circuit;
- a power factor correction circuit connected to the rectifier circuit; wherein,
- the power factor correction circuit has the first reference potential point, and the first common-mode inductor is disposed between the power factor correction circuit and the DC/DC conversion circuit.

5. The power conversion circuit according to claim 4, wherein,
- an equivalent impedance value between the AC/DC conversion circuit and the DC/DC conversion circuit is greater than ½ of an impedance value of the first common-mode inductor, wherein the equivalent impedance value between the AC/DC conversion circuit and the DC/DC conversion circuit and the impedance value of the first common-mode inductor are associated with an operating frequency of the power conversion circuit.

6. The power conversion circuit according to claim 5, further comprising a control circuit, wherein the control circuit comprising:
- a first control circuit for controlling switching devices in the AC/DC conversion circuit; and a second control circuit for controlling switching devices in the DC/DC conversion circuit;

wherein the first control circuit is electrically connected to the first reference potential point, and the second control circuit is electrically connected to the second reference potential point.

7. The power conversion circuit according to claim 6, further comprising an auxiliary power supply circuit, the auxiliary power supply circuit comprising:

a first auxiliary power supply circuit for powering the first control circuit; and a second auxiliary power supply circuit for powering the second control circuit;

wherein the first auxiliary power supply circuit and the second auxiliary power supply circuit are coupled to the transformer through a first auxiliary winding and a second auxiliary winding, respectively, a first end of the first auxiliary power supply circuit is connected to a first end of the first auxiliary winding, a second end of the first auxiliary power supply circuit is connected to a second end of the first auxiliary winding and electrically connected to the first reference potential point, a first end of the second auxiliary power supply circuit is connected to a first end of the second auxiliary winding, and a second end of the second auxiliary power supply circuit is connected to a second end of the second auxiliary winding and electrically connected to the second reference potential point.

8. The power conversion circuit according to claim 6, wherein the first control circuit and the second control circuit are separately powered by isolated power supplies respectively.

9. The power conversion circuit according to claim 1, wherein, the electric field shield is a metal shield layer.

10. A power supply device, comprising:

an insulating shell;

a metal shielding layer disposed within the insulating shell;

a power conversion circuit, comprising:

an AC/DC conversion circuit, wherein a DC side of the AC/DC conversion circuit has a first reference potential point;

a first common-mode inductor;

a DC/DC conversion circuit comprising a primary circuit having a second reference potential point, a secondary circuit and a transformer; wherein, a first terminal of the first common-mode inductor is connected to the DC side of the AC/DC conversion circuit, and a second terminal of the first common-mode inductor is connected to the primary circuit of the DC/DC conversion circuit;

the first reference potential point or the second reference potential point is connected to the metal shield layer.

11. The power supply device according to claim 10, wherein, the first reference potential point is a first reference ground, and the second reference potential point is a second reference ground.

12. The power conversion circuit according to claim 10, further comprising:

a first capacitor;

a second capacitor connected in parallel to an output terminal of the AC/DC conversion circuit;

a third capacitor connected in parallel to an input terminal of the DC/DC conversion circuit; wherein, a first end of the first capacitor is connected to one end of the third capacitor, and a second end of the first capacitor is electrically connected to one end of an output capacitor of the DC/DC conversion circuit.

13. The power conversion circuit according to claim 12, wherein, the third capacitor comprises a first resonant capacitor and a second resonant capacitor connected in series and having a first node therebetween;

the primary circuit of the DC/DC conversion circuit further comprises a switch bridge arm and a resonant inductor, a first end of a primary winding of the transformer is connected to a central point of the switch bridge arm through the resonant inductor, and a second end of the primary winding of the transformer is connected to the first node.

14. The power conversion circuit according to claim 10, wherein the AC/DC conversion circuit further comprises:

a rectifier circuit;

a power factor correction circuit connected to the rectifier circuit; wherein, the power factor correction circuit has the first reference potential point, and the first common-mode inductor is disposed between the power factor correction circuit and the DC/DC conversion circuit.

15. The power conversion circuit according to claim 10, wherein an equivalent impedance value between the AC/DC conversion circuit and the DC/DC conversion circuit is greater than ½ of an impedance value of the first common-mode inductor, wherein the equivalent impedance value between the AC/DC conversion circuit and the DC/DC conversion circuit and the impedance value of the first common-mode inductor are associated with an operating frequency of the power conversion circuit.

16. The power supply device according to claim 10, wherein the power conversion circuit comprises a control module, comprising:

a first control circuit for controlling switching devices in the AC/DC conversion circuit; and a second control circuit for controlling switching devices in the DC/DC conversion circuit;

wherein the first control circuit is electrically connected to the first reference potential point, and the second control circuit is electrically connected to the second reference potential point.

17. The power supply device according to claim 16, wherein the power conversion circuit comprises an auxiliary power supply module, comprising:

a first auxiliary power supply circuit for powering the first control circuit; and a second auxiliary power supply circuit for powering the second control circuit;

wherein the first auxiliary power supply circuit and the second auxiliary power supply circuit are coupled to the transformer through a first auxiliary winding and a second auxiliary winding, respectively, a first end of the first auxiliary power supply circuit is connected to a first end of the first auxiliary winding, a second end of the first auxiliary power supply circuit is connected to a second end of the first auxiliary winding and electrically connected to the first reference potential point, a first end of the second auxiliary power supply circuit is connected to a first end of the second auxiliary winding, and a second end of the second auxiliary power supply circuit is connected to a second end of the second auxiliary winding and electrically connected to the second reference potential point.

18. The power supply device according to claim 16, wherein the power conversion circuit comprises an auxiliary power supply module, comprising:

a first isolated power supply for powering the first control circuit; and a second isolated power supply for powering the second control circuit.

* * * * *